United States Patent [19]

Damm

[11] Patent Number: 5,009,195
[45] Date of Patent: Apr. 23, 1991

[54] ANIMAL GROOMING DEVICE AND PROCESS

[76] Inventor: Hiltraut M. Damm, 42 Butler Rd., Scarsdale, N.Y. 10583

[21] Appl. No.: 478,463

[22] Filed: Feb. 12, 1990

[51] Int. Cl.$^5$ ............................................. A01K 13/00
[52] U.S. Cl. ...................................... 119/86; 119/83; 15/160; 15/227
[58] Field of Search ............................ 119/83, 86, 89; 132/149, 219; 2/20, 161 R, 160, 159; 15/160, 227

[56] References Cited

U.S. PATENT DOCUMENTS

| | | | |
|---|---|---|---|
| 415,026 | 11/1889 | Cowen et al. | 15/227 |
| 1,497,035 | 6/1924 | Skoglund | 2/20 X |
| 1,583,606 | 5/1926 | Roussel | 2/20 X |
| 1,600,368 | 9/1926 | Skoglund | 15/160 |
| 1,783,788 | 12/1930 | Hatchett, Sr. | 15/227 X |
| 2,988,049 | 6/1961 | Bean | 119/83 |
| 3,107,665 | 10/1963 | Nordgren | 119/83 X |
| 3,354,491 | 11/1967 | Schlegel, Jr. | 15/227 X |
| 3,752,125 | 8/1973 | Jackson | 119/83 |

FOREIGN PATENT DOCUMENTS 2614758 11/1988 France .................................. 119/83

Primary Examiner—Robert P. Swiatek
Assistant Examiner—Todd E. Manahan

[57] ABSTRACT

The invention involves a grooming device designed for easy control over shedding hair and for beautification of animal coats such as those of long or short-haired cats and dogs. The device comprises a sheet of strong pliable and preferably stretchable material adapted to enfold the human hand and carrying on at least a portion of its surface an array of outwardly protruding hook-shaped bristles for contacting and brushing the animal's coat as the enfolded human hand is moved thereover. Advantageously the device is provided with apertures through which the thumb of either the right or the left hand can protrude and a closure or fastener to maintain the sheet on the hand. These features produce a speedy, positive grooming experience that is frequently sought-after, producing more beautiful fur, hightened bonding, increased socialization and a generally more amiable pet.

10 Claims, 4 Drawing Sheets

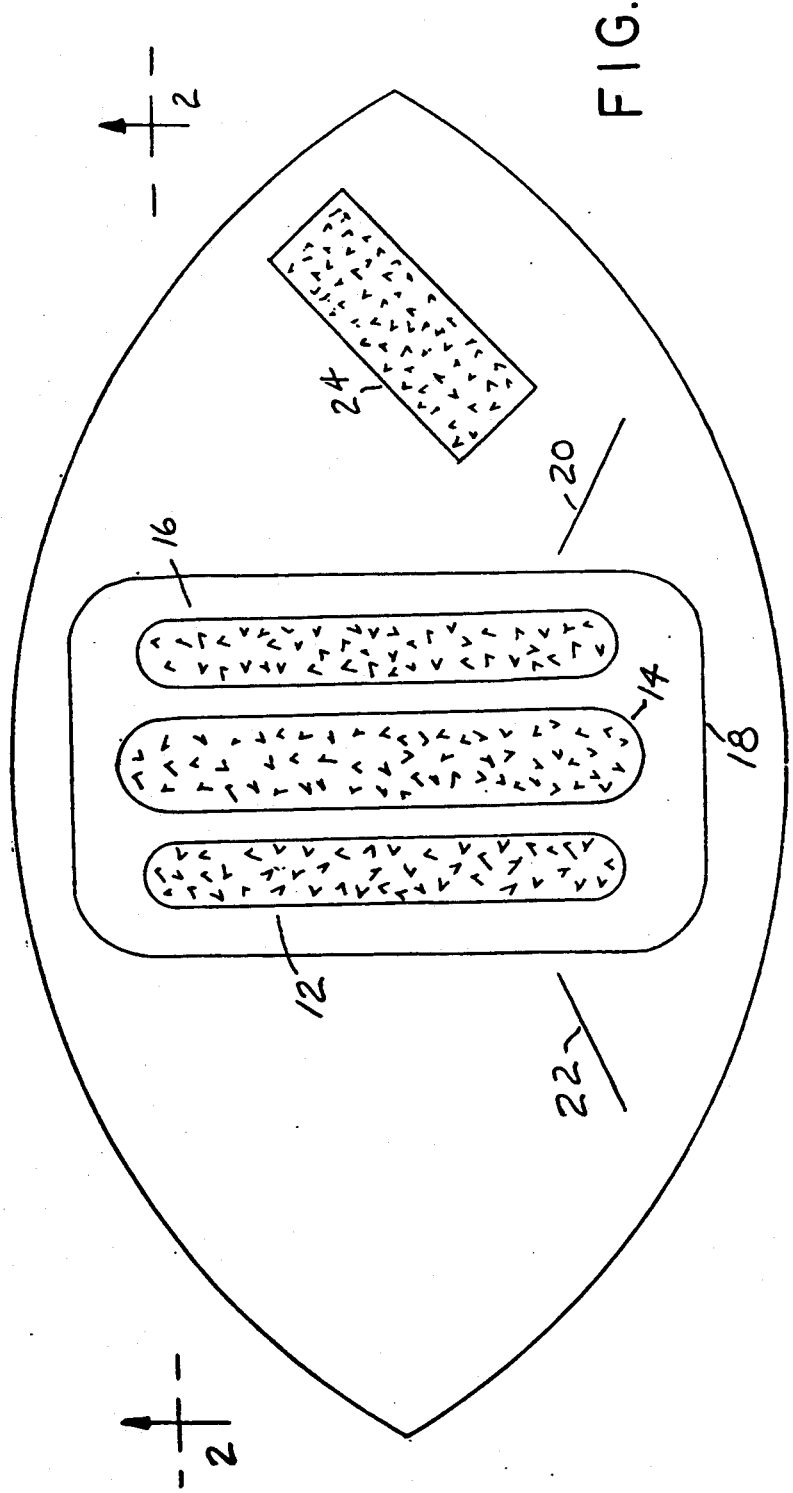

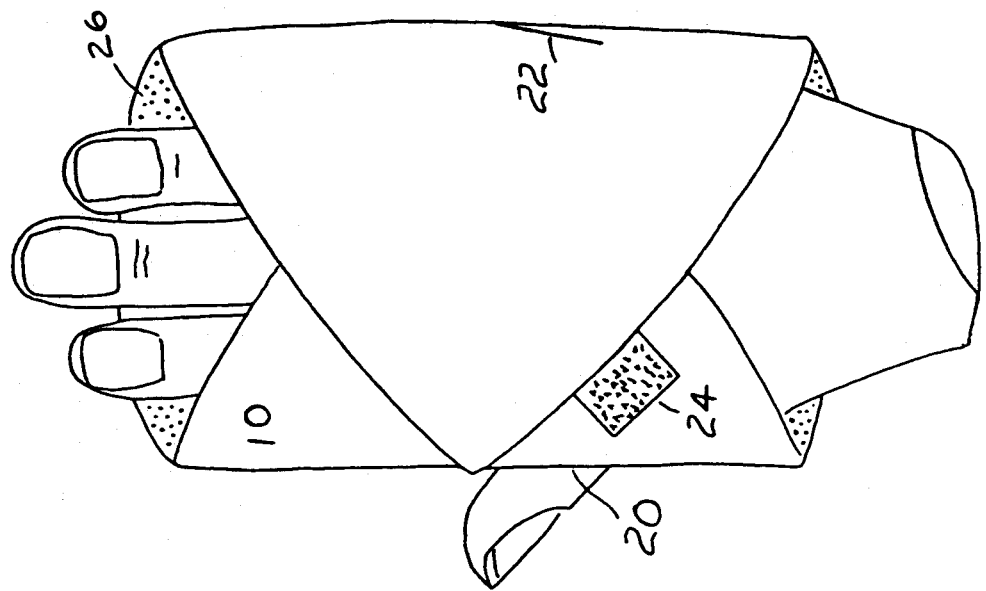
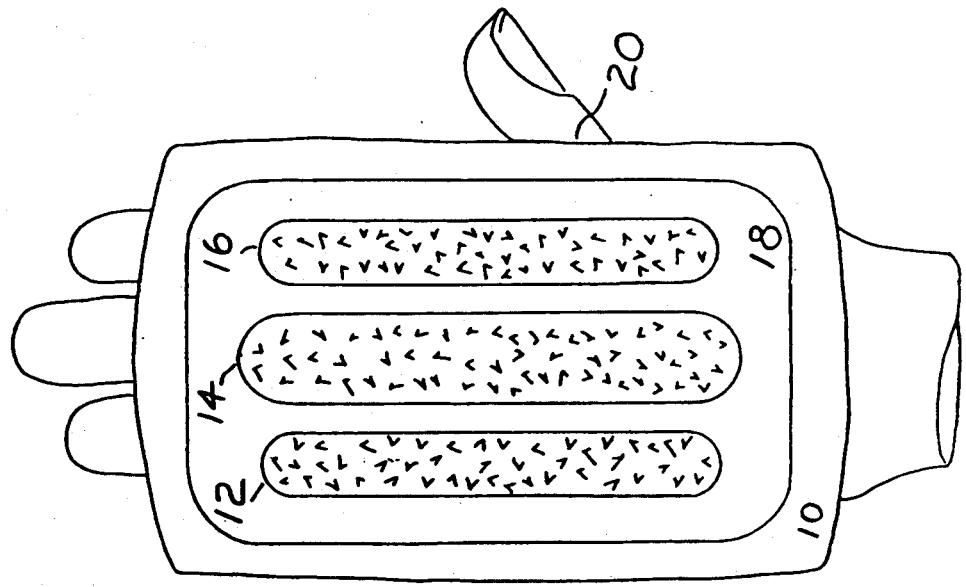

ANIMAL GROOMING DEVICE AND PROCESS

BACKGROUND

Currently, brushes made with metal, wood or plastic handles and containing bristles of natural or synthetic materials (eg. boar, plastic, rubber, metal etc.) are being used to groom an animal's coat. The sharp edges and hard handles of many of these devices tend to hurt a squirming animal, which then attempts to escape before a proper grooming job can be accomplished, adding further frustrations to the procedure as the groomer attempts harsher measures to hold the animal in place. The existing bristles can be another source of discomfort as they are varyingly too stiff, sharp or pointed, or have a one directional bend in their tips which promotes snaggling on tangled fur. Certain rubber devices on the market today, pull hair painfully, again prodding the animal to attempt a quick get-away..

There are several one-size-fits-all grooming gloves of varying materials on the market which are ineffective in one or more respects. None have adjusting means whereby the glove can be made to fit snugly, and as a result they slip around on the hand becoming less effective during brushing. Or their large size, extending cumbrously over the goomer's hand, frightens the animal away. None have adequate bristle structures to do a competent grooming job. In addition, the expansiveness of their bristle surface makes loosened hair removal difficult and time consuming.

In general, the prior existing devices require many more strokes for grooming because these brushes or oversized "gloves" have a flat, barely flexible surface which cannot adequately make contact with the round legs, tails and stomach areas of curved animal bodies. The animal's patience is tried and it attempts to run away.

SUMMARY OF THE INVENTION

The present invention concerns a novel device for grooming the coats of animals which overcomes may of the problems arising from the use of prior known devices. In its broadcast aspect the device comprises a substrate sheet of pliable, preferably elastic, material having dimensions suitable for snugly enfolding the human hand, preferably with only a single layer thereof covering the palm, said substrate sheet having affixed thereto on one surface a plurality of bristles the shafts of which are nominally perpendicular to said surface and positioned on said substrate sheet in a manner such that they can be brought into contact with an animal's coat by pressing said substrate sheet against the animal using the palm and/or fingers of a hand enfolded therein said substrate sheet containing at least one aperture through which the thumb of said hand can protrude while enfolded in said sheet with the bristle covering the palm areas, and said substrate sheet having a fastening means to maintain it in snug enfoldment of a human hand during the grooming process.

BRIEF DESCRIPTION OF THE DRAWINGS

FIG. 1 is a plan view of one embodiment of the grooming device of the present invention.

FIG. 2 is a side elevatinal view of the device of FIG. 1 and taken as illustrated substantially along line 2—2 of FIG. 1.

FIG. 3 is a perspective view of the device of FIG. 1 when the device is folded around a human right hand with the palm upward.

FIG. 4 is a perspective view of the device of FIG. 1 when the device is folded around a human right hand with the palm downward.

DETAILED DESCRIPTION

Figure 5:
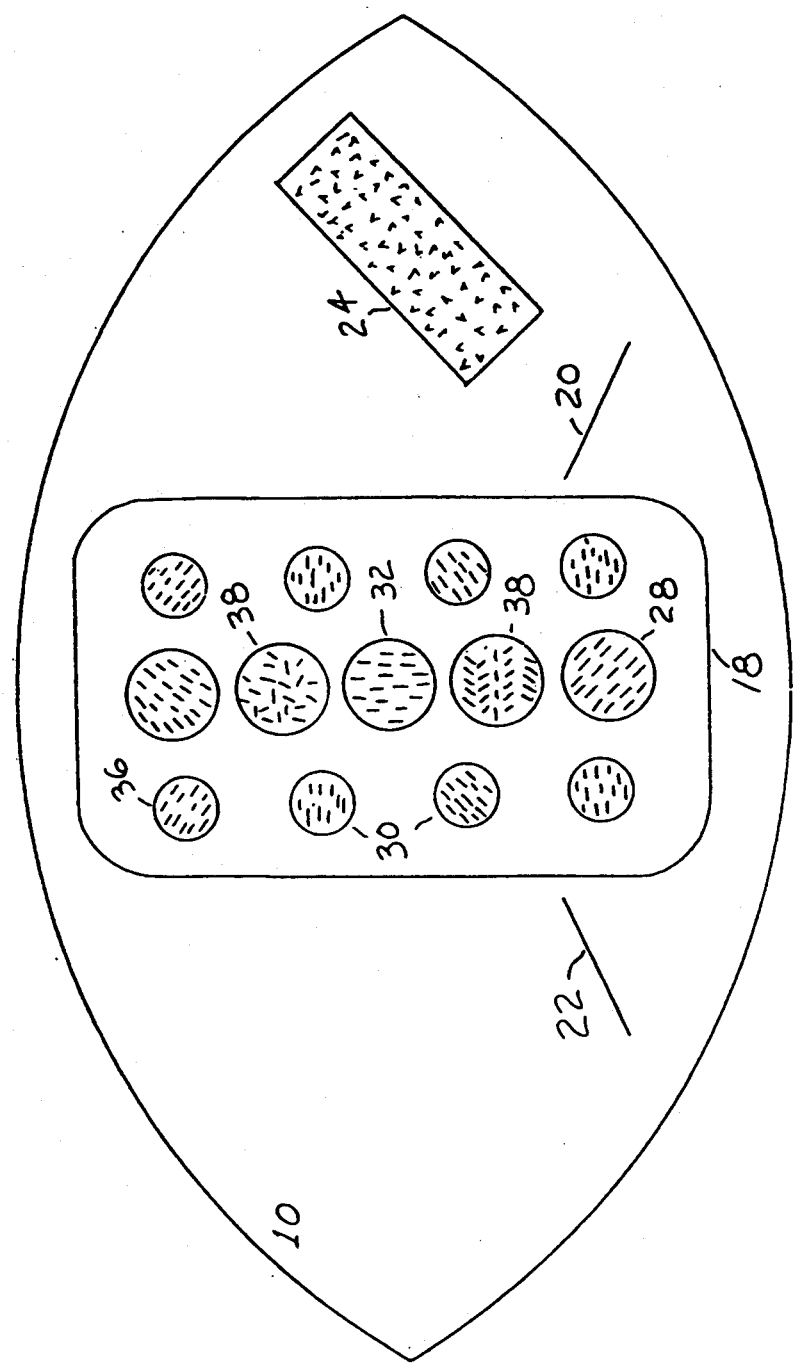
FIG. 5 is a plan view of another embodiment of the grooming device of the present invention.
Figure 6:
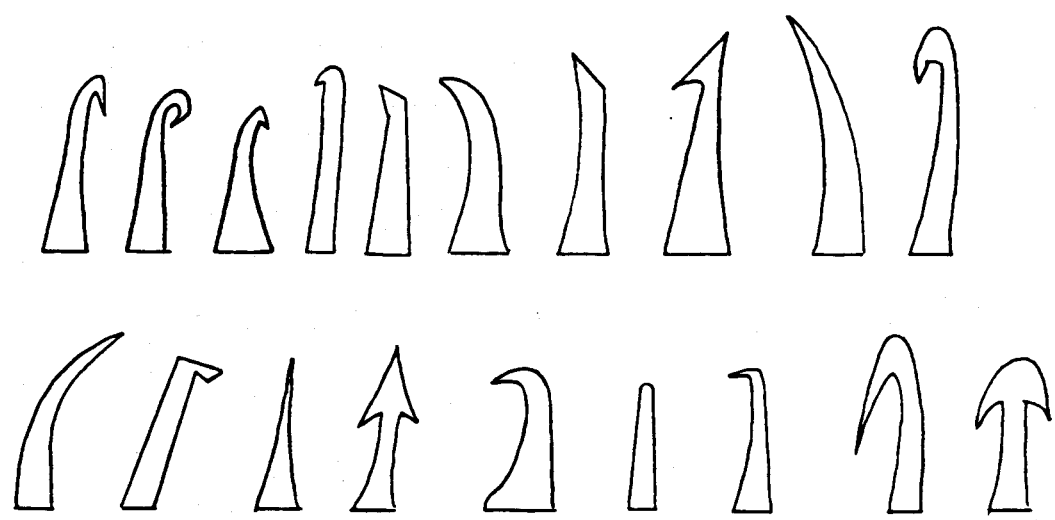
FIG. 6 is a view of a variety of possible bristle shapes envisioned for this invention.

Particularly with respect to FIG. 1 of the drawings, a preferred embodiment of the device of the present invention comprises a substrate sheet 10 formed from a material which is sufficiently pliable so that when wrapped around the human hand the sheet will conform generally with the hand, particularly when the hand is cupped, i.e., the fingers bent somewhat inwardly in the conformation employed when patting or stroking an animal. Such material can be of a rubber or rubber-like composition, plastic, a fabric such as canvas, denim or felt or a composite of several such materials. Because it is a principal advantage of the present grooming device that it is capable of functioning as a brushing device while at the same time causing minimal awareness of its presence to the animal being groomed, it is advantageous that the substrate sheet be formed of a pliable and an elastic material in order that it can comfortably yet snugly conform to the human hand as is shown in FIG. 3 and FIG. 4 and not be perceived by the animal as a grooming device distinct and separate from the human hand.

The thickness of the substrate sheet is not a critial factor, it being necessary only that is possesses sufficient strength to support an array of bristles having their shafts in a generally perpendicular direction with respect to the surface of the sheet in order to perform a brushing effect on the animal's coat when in use. As used herein and in the appended claims the term "surface" from which bristles protrude is intended to designate one of the two large of expansive areas of the substrate sheet as distinguished from the edge or edges of such sheet.

As shown in FIG. 1, the substrate sheet 10 is provided with two slits or apertures 20 and 22 placed to accomodate the thumb of the right hand and the thumb of the left hand, respectively. Though not an essential feature of the device in its broadest aspect, it is found that the positioning of the thumb through the aperture 20 or 22, when the hand is enfolded by the device, serves the very important functions of controlling the position of the device on the hand and also permitting the thumb to contact the animal being groomed in order to more closely simulate normal petting of the animal rather than a grooming procedure. Accordingly the presence of at least one such thumb-accomodating aperture is highly preferred. Additional apertures can be provided if desired, to accomodate hands of different sizes, for example.

It is also an important aspect of the present grooming device that substrate sheet 10 be provided with a fastening or closure means so that the sheet can be securely retained in place when positioned on the hand. The fastening means is not a narrowly critical factor and can comprises snaps, a buckle and strap, a zipper-type means and the like, but for ease of operation and versatility in fitting various size hands, a fastener comprising a loop pile fabric which is designed to mesh with a hook pile fabric, i.e. a fastener commercially available under the name VELCRO, a trademark of the American Velcro Company, is preferred. As used hereinafter such fastening devices are identified as intermeshing hook pile and loop pile material. In FIG. 1 the active, i.e. hook pile member, is identified by reference number 24. The loop pile member is located on the under-surface off sheet 10 at the opposite end of the sheet from member 24. The entire undersurface of sheet 10 can be of the loop pile material as indicated by reference number 26.

In a preferred embodiment of the device as shown in FIG. 1, 2, 3 & 4, the bristles located in the area 12, 15, and 16, are contained in a reinforcing member 18 which provides a supporting matrix to which the bristles are firmly attached in a generally perpendicular manner. This member 18 is advantageously formed of a durable, pliable, waterproof material such as a plastic or rubber type, or any synthetic or natural product which fits the above mentioned criteria, such as may be employed in the manufacture of conventional brushes. Although member 18 is illustrated in most of the drawings as a single piece containing all of the bristles in elongated, spaced columns, a number of the bristles can be attached to each of an array of two or more individual members to facilitate flexibility of the device when in use, as seen in FIG. 5. It is even feasible that the matrix be eliminated altogether and that the bristles are attached directly to the substrate sheet, perphaps with a reinforcing layer of material on those areas of the substrate sheet to which the bristles are attached.

The length and nominal diameters of the bristles, i.e. the coarseness of the bristles and the material from which the bristles are formed, will depend upn the particular type of animal to be groomed. The bristles can be natural, i.e. animal-derived such as boar bristle, or of synthetic, i.e. plastic, or also metal materials as bristles of conventional brushes are. While in general the configuration of the bristles is not narrowly critical, i.e. they can be cylindrical or tapered, it is advantageous that at least some of the bristle ends protruding from the substrate sheet are bent or hooked so that the bristles will more easily penetrate matted hair and readily engage and remove loose hair and foreign matter in the animal's coat during the grooming procedure. The optimal degree of bending or hooking will vary depending upon the particular type of animal to be groomed.

In FIG. 2, which is a cross-section of the device of FIG. 1 taken along line 2—2, the bristles are shown as being hooked.. As used herein and in the claims, the term "hooked" as applied to the bristles of the present grooming device is intended to means that the free ends of the bristles are angled or curved away from the axis of the bristle shaft. While the degree of the angle of extent of the curve is not critical, it is preferred that the greater the angle the more flexible the material comprising the tips be as compared to the shaft, so that the tip can "uncurl" to release a tangle of fur that would otherwise "pull" and hurt the animal if it were to remain fixedly lodged in the bristle hook as the stroke continues its course.

Although the bristles may be made of a number of different materials, the ideal is some polymer which is soft yet firm; stiff enough to unsnarl tangles, yet pliable enough to release a tangle that would hurt the animal. A shape that is thicker at the bottom, tapering toward the tip, if found to be very effective in this regard. Although the device will work with straight bristles, it is preferred, as discussed herein above, that the tips have a flexible bend or curve in them to more effectively grasp loose hair and dig under matted hair. Although they may be shorter or longer than the following suggestions, bristle lengths in the areas of 0.25, 0.50, 0.75, 1 and 1.25 inches work well on various devices designed for various different types of animal coats. It is feasible that bristles of several different lengths and stiffnesses be contained on the same brush; or that a configuration of hooked and straight bristles be arranged on the same device.

In all of the embodiments in which hooked bristles are utilized, it is found that unexpectedly superior grooming results are obtained when said hooking or bendin is in a number of different directions. Ease of movement of the bristles through the animal's coat is greatly facilitated by not having the plane of all of the bristle hooks aligned and in the same direction as the movement of the device. With the planes of the hooks in various direction, all of the bristles pass through the coat producing a brushing action, but only those bristles which are hooked in the direction of movement of the device engage hair and extraneous matter to be removed, thereby causing less resistance to the passage of the device. In addition, this arrangement prevents the cumulative action of all of the hooks engaging hairs of the animal's coat at the same time which could result in painful pulling of fur that is matted, tangled or prone to furballs. In a preferred embodiment, the planes of the hooked or bent bristles are random so that in all directions of movement of the device through the animal's coat, at least some of the bristles engage and remove loose hair or foreign matter, without the device having to be repositioned for additional strokes that would extend the grooming time unnecessarily.

In another preferred embodiment, the bristles are contained in a plurality of arrays, the arrrays being spaced apart so that the flexibility of the substrate surface to which the bristles are attached is not unduly impaired. Such as embodiment is shown in FIG. 5. wherein a bristle array is identified by reference number 28. The other reference numbers in FIG. 5 identify the same features as in FIG. 1. The configuration and number of arrays 30 is not critical. Their shape will depend on the overall effect achieved by the interaction of the entire design. For instance, a lesser degree of flexibility of the substrate sheet may necessitate the use of oval arrays which will achieve greater flexibility there being more space between the bristles arrays. Oval arrays, by being limited in the number of bristles their shape can contain, also pass more readily through an animal's coat. On the other hand, more rectangular arrays will provide a greater degree of stiffness, should that be called for, as well as greater brushing action because of the larger number of bristles contained therein. The individual hooked bristles 32 of each array are shown as having the planes of their hooks in essentially the same direction, but with the direction of the planes of adjacent arrays being different. In another configuration the planes of the bristle hooks within any given array can be randomly oriented. Regardless of hook orientation, the bristles themselves can be alinged in rows an in array 34, in staggered rows as in array 35 or randomly placed as in array 38.

In the perspective views of FIG. 3 and FIG. 4, the device of FIG. 1 is shown in place on a human hand. While in these views the device is illustrated as having dimensions such that the fingers and thumb of the hand are partially exposed, it is within the scope of the present invention that the dimensions of sheet 10 are such as to expose substantially all of the fingers or essentially none of the fingers. It is preferred, however, that at least some exposure and freedom of movement of the fingers and thumb be permitted in order to minimize awareness by the animal of the presence of the grooming device when in use.

In the particular arrangement of the bristle arrays or columns 12, 14 and 16 of the device embodiment shown in FIGS. 1, 2, 3 and 4 and 5, the central group of bristle arrays or panel is a little longer than the other two groups of arrays or panels to maximize coverage of the animal's body. A convenient, though not critical, length for the panel 14 is about 5 inches with the panels 12 and 16 being proportionaly shorter, i.e. about 3.75 inches long. In this arrangement the bristle-bearing area can conform to the oval shape of the hand and allow room for the thumb apertures or slits which are conveniently located near the bottom, outside edge of the shorter panels or arrays and are about 1.5 inches long. The width of the panels 12, 14 and 16 are conveniently about 0.75 inches wide. The bristle panels are spaced apart, about 0.25 inches in this particular embodiment, to provide greater flexibility of the overall device and, quite importantly, to provide easy access for removal from the device of animal hair enmeshed therein during the grooming process.

While the device of the present invention is suitable for grooming all types of fur-bearing animals, it is particularly useful for grooming relatively small animals such as cats and dogs. Hair removal, fur beautification, socialization and pet personality enhancement, are all results which stem from the use of the present device. These results are achieved by several means. Soft materials, flexible structure, snug fit and unique bristle design all work together to provide a safe, effective and efficient grooming experience that is altogether enjoyable for pet and groomer alike. Advantageously the entire device, both substrate and bristles, are made of soft materials which will not hurt the animal. The unique design of the bristles themselves in the most preferred embodiment and their placement on the substrate sheet are designed to promote ease of movement through the fur, without compromising their loose hair removal properties.

The flexible structure of the overall device is designed to curve along the contours of the animal so that fewer strokes are needed to accomplish a thorough grooming job. For example, a minimum of four strokes is required by an ordinary stiff-surfaced brush to even minimally cover all sides of a leg or tail. All of this area can be covered by one stroke of a device of the present invention when it is curled around the body part. The same principle applies in covering variously shaped aligned body parts such as the side and stomach. These can all be covered at the same time with the same single stroke of the present device, an impossibility with a regular rigid brush. Furthermore, this flexible device makes far better contact with differently shaped body parts such as a head, ear, neck, back, or tail, for example, by adapting the shape of the hand to that of the body part; supplying maximum grooming with a minimum of repositioning of the device. It is similarly possible to vary the pressure to different body parts during the same stroke, e.g. the heal of the hand can press more firmly than the fingers, the outer side exert more pressure than the thumb side, etc. This unique feature of the device enables adaptation, on a continually responsive basis, to the differing fur conditions or body parts of the animal, maximizing the pets comfort in, and enjoyment of, the grooming experience.

The specially designed hooked bristles of the preferred embodiment ensure effective hair removal as well as non-painful yet vigorous stimulation of the skin for beauty, health and pleasure. Their multi-directioned curved tips facilitate random hand sweeps which accomodate changing body positions of the animal. This design facilitates smooth and easy movement through the fur and eliminates painful tangle tugs. The bristles' configuration in spaced panels or arrays provides flexibility, allows the broadest possible coverage of the animal's body, while at the same time contributing to special ease of loosened-hair removal.

The snug fit to the hand of this adjustable device not only enhances the brushing action, but also increases the intimacy between pet and groomer because hand and brush are one. Rather than feeling administered to by a hard external device, the animal feels petted and loved. Pet socialization and bonding are natural consequences of this activity, rather than the antagonizing and distancing that is engendered by harsher grooming techniques. Thus the amiable creature becomes a better pet.

It has been observed that an unexpected consequence of using the device is the self-grooming that animals, especially cats, subsequently engage in.

The entire device is easily fabricated from washable materials and can be used, without fear of rusting, during the pet's bath.

A primary advantage of this device is the time saved during grooming, as well as the rendering of the painless, pleasant sensations that encourage the pet to welcome frequent grooming sessions which produce all the results mentioned above.

Although specific materials and dimensions are envisioned in the foregoing description of the device, the present device can be constructed of different materials than those mentioned, and in slightly differing dimensions, and still retain the concepts and achieve the goals envisioned in the Summary and Detailed Description. The entire device can be made of one molded polymer substance, as long as the proper areas of the design are stiff enough or flexible enough to attain the results described above. Different closure methods could also be devised. The above disclosure is not intended to be exhaustive or limit the invention to the percise form entailed. Many modifications and variations are possible in light of the above teaching.

What is claimed is:

1. A device for grooming the coat of fur-bearing animals which comprises a substrate sheet of pliable material having dimensions suitable for snugly enfolding the human hand, said substrate sheet having affixed thereto on at least one of its surfaces a plurality of bristles, the shafts of which are nominally perpendicular to said surface and at least some of said bristles having a hooked configuration, said bristles being positioned on said substrate in a manner such that they can be brought into contact with an animal's coat by pressing said substrate sheet against the animal using the palm or fingers of a hand enfolded therein, said substrate sheet having a fastening means to maintain it in snug enfoldment of a human hand, and containing at least one aperture through which the thumb of said human hand can protude while said hand is enfolded in said substrate sheet with the bristles covering the palm area.

2. Device according to claim 1 wherein the substrate sheet is formed from an elastic material.

3. Device according to claim 1 wherein the dimension of the substrate sheet are such as to be capable of snugly enfolding the human hand with only a single layer thereof covering the palm area.

4. Device according to claim 1 wherein the substrate sheet contains at least two apertures, one of which is positioned to permit the thumb of the right hand to protrude when said sheet is enfolding the right hand, and one of which is positioned to permit the thumb of the left hand to protrude when said sheet is enfolding the left hand.

5. Device according to claim 1 wherein the planes of the hooks of the bristles are oriented in at least two directions.

6. Device according to claim 1 where the planes of the hooks of the bristles are randomly oriented.

7. Device according to claim 1 wherein the fastening means comprises intermeshing hook pile and loop pile material.

8. Device according to claim 1 wherein the bristles are located on the substrate sheet in two or more distinct arrays, each array containing a plurality of bristles and said arrays being spaced apart to facilitate the removal of hair intertwined in said bristles as a result of use in grooming an animal's coat.

9. Device according to claim 1 wherein the device is formed of materials not degraded by contact with water.

10. A method of grooming the fur coat of an animal which comprises stroking said coat with the bristles of a device comprising a substrate sheet of pliable material having dimensions suitable for snugly enfolding a human hand, said substrate sheet having affixed thereto on at least one of its surfaces a plurality of bristles, the shafts of which are nominally perpendicular to said surface and at least some of said bristles having a hooked configuration, said bristles being positioned on said substrate sheet in a manner such that they can be brought into contact with an animal's coat by pressing the substrate sheet against the animal using the palm or fingers of a hand enfolded therein, said substrate sheet having fastening means to maintain it in snug enfoldment of a human hand and containing at least one aperture through which the thumb of said hand can protrude while said hand is enfolded in said substrate sheet with the bristles covering the palm area.

* * * * *